(12) United States Patent
Blake et al.

(10) Patent No.: US 8,364,904 B2
(45) Date of Patent: Jan. 29, 2013

(54) HORIZONTAL CACHE PERSISTENCE IN A MULTI-COMPUTE NODE, SYMMETRIC MULTIPROCESSING COMPUTER

(75) Inventors: Michael A. Blake, Wappingers Falls, NY (US); Lawrence D. Curley, Endwell, NY (US); Garrett M. Drapala, Poughkeepsie, NY (US); Edward J. Kaminski, Wynnewood, PA (US); Craig R. Walters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/819,348

(22) Filed: Jun. 21, 2010

(65) Prior Publication Data

US 2011/0314227 A1    Dec. 22, 2011

(51) Int. Cl.
    *G06F 12/00*    (2006.01)
(52) U.S. Cl. ........................................ 711/141
(58) Field of Classification Search .................. None
See application file for complete search history.

(56) References Cited

U.S. PATENT DOCUMENTS

| | | | |
|---|---|---|---|
| 7,111,130 B2 | 9/2006 | Blake et al. |
| 7,305,522 B2 | 12/2007 | Clark et al. |
| 7,305,523 B2 | 12/2007 | Guthrie et al. |
| 7,305,524 B2 | 12/2007 | Hoover et al. |
| 7,469,321 B2 | 12/2008 | Heller, Jr. |
| 7,669,013 B2 | 2/2010 | Carpenter et al. |
| 7,689,771 B2 | 3/2010 | Fields, Jr. et al. |
| 2008/0320226 A1 | 12/2008 | Blake et al. |
| 2009/0164731 A1 | 6/2009 | Le et al. |
| 2009/0177821 A1 | 7/2009 | Dinkjian et al. |

*Primary Examiner* — Brian Peugh
(74) *Attorney, Agent, or Firm* — Edward J. Lenart; John E. Campbell; Biggers & Ohanian, LLP

(57) ABSTRACT

Horizontal cache persistence in a multi-compute node, SMP computer, including, responsive to a determination to evict a cache line on a first one of the compute nodes, broadcasting by a first compute node an eviction notice for the cache line; transmitting the state of the cache line receiving compute nodes, including, if the cache line is missing from a compute node, an indication whether that compute node has cache storage space available for the cache line; determining by the first compute node, according to the states of the cache line and space available, whether the first compute node can evict the cache line without writing the cache line to main memory; and updating by each compute node the state of the cache line in each compute node, in dependence upon one or more of the states of the cache line in all the compute nodes.

24 Claims, 9 Drawing Sheets

US 8,364,904 B2

HORIZONTAL CACHE PERSISTENCE IN A MULTI-COMPUTE NODE, SYMMETRIC MULTIPROCESSING COMPUTER

BACKGROUND OF THE INVENTION

1. Field of the Invention

The field of the invention is data processing, or, more specifically, methods, apparatus, and products for horizontal cache persistence in a multi-compute node, symmetric multiprocessing ('SMP') computer.

2. Description Of Related Art

Contemporary high performance computer systems, such as, for example, the IBM System z series of mainframes, are typically implemented as multi-compute node, symmetric multiprocessing ('SMP') computers with many compute nodes. SMP is a multiprocessor computer hardware architecture where two or more, typically many more, identical processors are connected to a single shared main memory and controlled by a single operating system. Most multiprocessor systems today use an SMP architecture. In the case of multi-core processors, the SMP architecture applies to the cores, treating them as separate processors. Processors may be interconnected using buses, crossbar switches, mesh networks, and the like. Each compute node typically includes a number of processors, each of which has at least some local memory, at least some of which is accelerated with cache memory. The cache memory can be local to each processor, local to a compute node shared across more than one processor, or shared across compute nodes. All of these architectures require maintenance of cache coherence among the separate caches.

Taking for example a computer with multiple levels of caches, the caches form a vertical structure with smaller caches towards the processor and consistently larger caches, called L1-L2-L3-L4, moving towards main memory. As data within this type of system is aged out from a given level of cache, due to more recent cache fetches requiring storage space, cache lines move from L1 to L2, then from L2 to L3, from L3 to L4, with an eventual write back to main memory as the eviction process completes.

In an architecture with multiple identical compute nodes having horizontal communications among one of the cache levels, L4 to L4 communications for example, then the same type of eviction policy going on in the system can additionally evict a cache line from one L4 to another L4, before completing the eviction out to main storage. This type of cache management structure for evicted cache lines is commonly seen in some variant across many contemporary multi-level/multi-compute node cache designs. One problem with this management scheme arises from the fact that as your observe the latency incurred in crossing each level/link between caches, the penalty increases significantly in magnitude. As a result, a typical processor fetch from L1 may incur a penalty of x, while the fetch from a corresponding L2 may incur a penalty of 3x, and from L3 would be 10x respectively, and so on, with main storage access being substantially higher in access penalty.

As a result of this exponential increase in latency penalty numerous schemes have been devised to improve caching algorithms, such that the selected cache lines for eviction are better chosen for a given system design and respective workload. Besides this, various prefetch algorithms have been created at different levels of caches in hardware and software to try and preempt the processors request for a given cache line such that the exponential effect of cache latency penalty could be avoided or diminished in some regard. The drawbacks of both of these types of solutions and many others are that they require large amounts of additional hardware and/or software support to provide any measurable gains.

SUMMARY OF THE INVENTION

Methods, apparatus, and computer program products for horizontal cache persistence in a multi-compute node, symmetric multiprocessing computer, the computer having a plurality of compute nodes, each compute node including at least one processor operatively coupled through a cache controller to at least one cache of main memory, the main memory shared among the compute nodes, each cache controller coupled for data communications to cache controllers on other compute nodes, including, responsive to a determination to evict a cache line on a first one of the compute nodes, broadcasting by the first compute node to other compute nodes an eviction notice for the cache line; responsive to receiving the eviction notice, transmitting from each of the compute nodes receiving the eviction notice to all other compute nodes the state of the cache line on that compute node, including, if the cache line is missing from that compute node, an indication whether that compute node has cache storage space available for the cache line; evicting the cache line by the first compute node, including determining by the first compute node, in dependence upon the states of the cache line in other compute nodes and space available in other compute nodes, whether the first compute node can evict the cache line without writing the cache line to main memory; and updating by each compute node the state of the cache line in each compute node, in dependence upon one or more of the states of the cache line in all the compute nodes.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
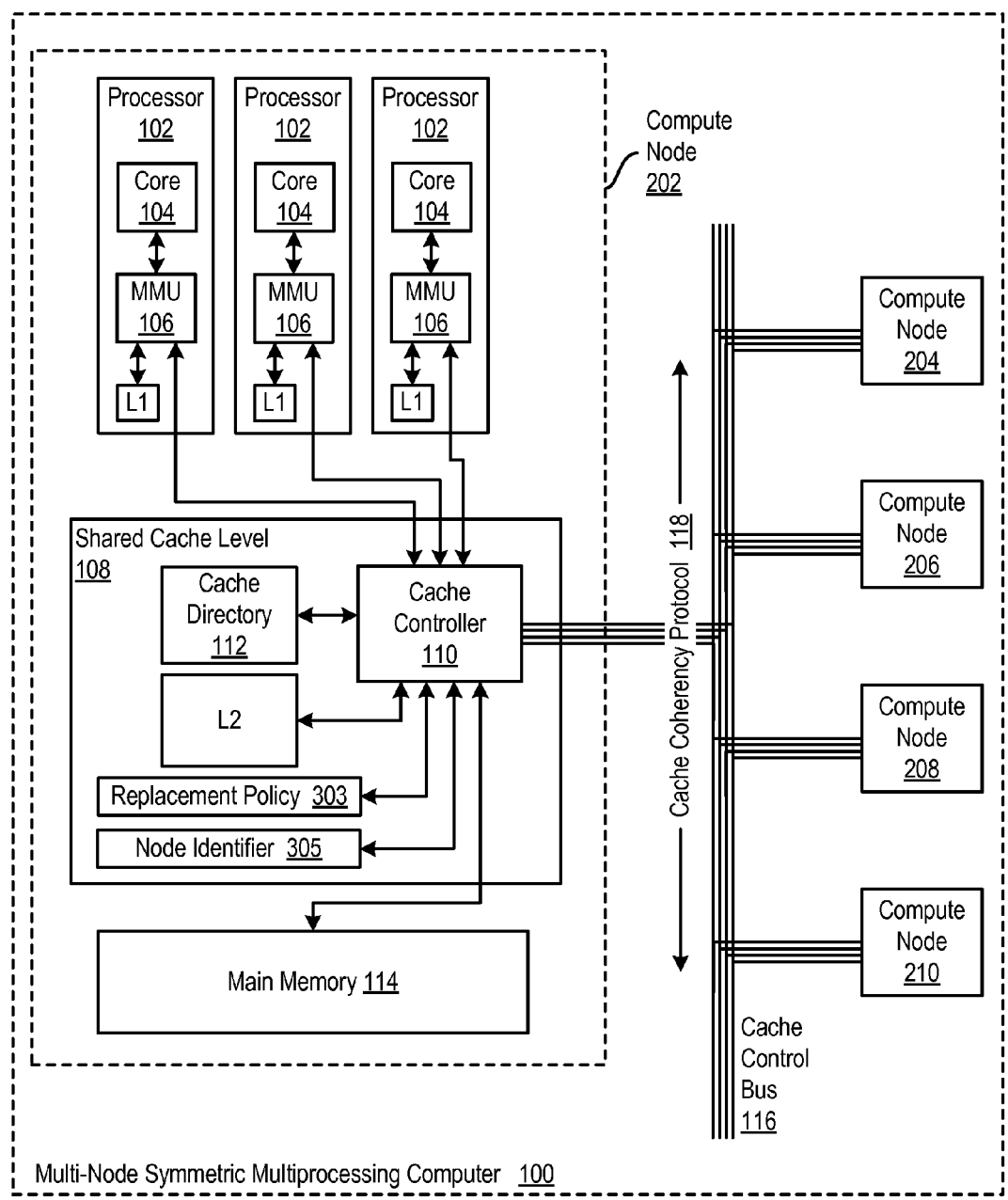
FIG. 1 sets forth a functional block diagram of an example of a multi-compute node, symmetric multiprocessing computer that implements horizontal cache persistence according to embodiments of the present invention.

Example methods, apparatus, and computer program products for horizontal cache persistence in a multi-compute node, symmetric multiprocessing computer according to embodiments of the present invention are described with reference to the accompanying drawings, beginning with FIG. 1. FIG. 1 sets forth a functional block diagram of an example multi-compute node, symmetric multiprocessing computer (100) that implements horizontal cache persistence according to embodiments of the present invention. As the term is used here, 'horizontal cache persistence' refers to retaining in cache an evicted cache line rather than writing the evicted cache line to main memory or evicting the cache line entirely from cache so that a subsequent read from main memory is required when the cache line is next accessed. Horizontal cache persistence means that a cache line evicted from a shared cache level on one compute node is maintained in cache in another compute node rather than completely evicted from the entire shared cache level and therefore from all cache memory to reside only in main memory. If the cache line is dirty, the complete eviction incurs two undesirable accesses of main memory, one write and one additional read from main memory when the cache line, or any memory address in the cache line, is next accessed by a processor. If the cache line is not dirty, completely evicting the cache line from all cache still incurs an additional read from main memory when the cache line, or any memory address in the cache line, is next accessed by a processor. Compared to a cache hit on any level of cache, any main memory access incurs an extreme penalty in terms of memory operation latency.

In embodiments, horizontal cache persistence is implemented in the overall context of cache coherence. "Cache coherence" generally indicates:

- A cache read by processor P to location X following a write by P to X, with no writes of X by any other processor between P's write and read instructions, must always return the value written by P. This requirement is a condition of program order preservation and is needed even in monoprocessed architectures.
- A cache read by processor P1 to location X following a write by another processor P2 to X must return the value written by P2 if no other writes to X are made by any processor between the two accesses. This condition defines a coherent view of cache memory. If processors can read the same old value after the write by P2, the cache is incoherent.
- Cache writes to the same location must be sequenced. In other words, if location X received two different values A and B, in this order, by any two processors, the processors can never read location X as B and then read it as A. The location X must be seen with values A and B in that order.

In embodiments, cache coherence in caches distributed across compute nodes is maintained by communications protocols called 'cache coherence protocols.' There are a number of cache coherence protocols, traditionally named according to the cache line states supported by the protocol. The MSI protocol, for example, supports cache line states of:

MODIFIED: A cache line in the MODIFIED cache line state has been modified in the cache. The data in the cache is then inconsistent with the backing store (e.g., main memory). A cache with a cache line in the "M" state has the responsibility to write the cache line to the backing store when the cache line is evicted.

SHARED: A cache line in the SHARED cache line state is unmodified and exists in at least one cache. The cache can evict the data without writing it to the backing store.

INVALID: A cache line in the INVALID state contains invalid data, and must be fetched from memory or another cache if the cache line is to be stored in this cache. Note that cache lines that are completely missing from a cache may also be characterized as INVALID in the cache.

The MESI protocol adds an EXCLUSIVE cache line state to the states of the MSI protocol. The MOESI protocol adds an OWNED cache line state to states of the MESI protocol. And so on.

The example computer (100) of FIG. 1 includes several compute nodes (202, 204, 206, 208, 210). Actually the example of FIG. 1 illustrates a computer (100) with five compute nodes, but this number five is only for ease of explanation, not for limitation of the invention. Readers will recognize that SMP computers that implement horizontal cache persistence according to embodiments of the present invention can have any number of compute nodes. The IBM System z10™ series of mainframe computers, for example, each can include up to 64 compute nodes or, in z10 terminology, "frames." The IBM Blue Gene™ series of supercomputers can support thousands of compute nodes.

The diagram of one of the compute nodes (202) is expanded to illustrate the structure and components typical to all of the compute nodes. Each compute node includes a number of computer processors (102). The number of computer processors per compute node is illustrated here as three, but this is for ease of explanation, not for limitation. Readers will recognize that each compute node can include any number of computer processors as may occur to those of skill in the art. The compute nodes in the IBM System z10 series of mainframe computers, for example, each can include up to 64 processors.

Each processor (102) in the example of FIG. 1 includes a compute core (104) that is coupled for memory operations through a memory management unit ('MMU') (106) and a cache controller (110) to two caches L1 and L2, and to main memory (114). L1 is a relatively small, high speed cache fabricated into the processor itself. The MMU (106) includes address translation logic, a translation lookaside buffer, controls for the on-processor cache L1, and so on. The cache controller (110), with the L2 cache, a cache directory (112), and a cache control bus (116) bearing data communications among the compute nodes according to a cache coherency protocol (118), implements a shared cache level (108) across the compute nodes (202, 204, 206, 208, 210) of the computer.

The main memory (114) is the principal, random access store of program data and program instructions for data processing on the computer (100). Main memory (114) is characterized by memory latency, the time required for a memory access, a read or write to or from main memory. In this example, main memory (114) represents a single extent of physical address space, but main memory is physically segmented and distributed across compute nodes, so that a main memory access from a processor on one compute to a main memory segment on the same compute node has smaller latency than an access to a segment of main memory on another compute node. This segmentation of main memory is described here for ease of explanation of relative effects on latency, not for limitation of the invention. Main memory can be implemented off-compute node entirely in a single, non-segmented set, separately from processors on compute nodes exclusively dedicated to main memory, and in other ways as will occur to those of skill in the art. However main memory is implemented, though, it is always much slower than a cache hit.

The caches L1 and L2 are specialized segments of memory used by the processors (102) to reduce memory access latency. Each cache is smaller and faster than main memory, and each cache stores copies of data from frequently used main memory locations. When a processor needs to read from or write to a location in main memory, it first checks whether a copy of that data, a "cache line," is in a cache. If so, the processor immediately reads from or writes to the cache, which is much faster than reading from or writing to main memory. As long as most memory accesses are cached memory locations, the average latency of memory accesses will be closer to the cache latency than to the latency of main memory. As mentioned, main memory is much slower than any cache, and cache misses extract a heavy toll in memory access latency.

Cache memory is organized in blocks of data referred to as 'cache lines.' Each cache line in different designs may range in size from 8 to 512 bytes or more. The size of a cache line typically is larger than the size of the usual access requested by a CPU instruction, which ranges from 1 to 16 bytes—the largest addresses and data typically handled by current 32 bit- and 64 bit-architectures being 128 bits or 16 bytes in length. Each cache line is characterized by a 'tag' composed of most significant bits of the beginning address where the contents of the cache line are stored in main memory.

In the example of FIG. 1, caches L1 and L2 implement a multi-level cache with two levels. Multi-level caches address the tradeoff between cache latency and hit rate. Larger caches have better hit rates but longer latency. To address this tradeoff, many computers use multiple levels of cache, with small fast caches backed up by larger slower caches. Multi-level caches generally operate by checking the smallest Level 1 (L1) cache first; if it hits, the processor proceeds at high speed. If the smaller cache misses, the next larger cache (L2) is checked, and so on, before main memory is checked. The example computer of FIG. 1 implements two cache levels, but this is only for ease of explanation, not for limitation. Many computers implement additional levels of cache, three or even four cache levels. Some processors implement as many as three levels of on-chip cache. For example, the Alpha 21164™ has a 96 KB on-die L3 cache, and the IBM POWER4™ has a 256 MB L3 cache off-chip, shared among several processors. In the example of FIG. 1, the L2 cache is shared directly among the processors on a compute node and among processor on all compute nodes through cache controller (110) on each compute node, the cache control bus (116), and the cache coherency protocol (118).

The cache directory (112) is a repository of information regarding cache lines in the caches. The directory records, for each cache line in all of the caches on a compute node, the identity of the cache line or cache line "tag" and the cache line state, MODIFIED, SHARED, INVALID, and so on. The MMUs (106) and the cache controllers (110) consult and update the information in the cache directory with every cache operation on a compute node. The cache controller (110), connected directly to L2, has no direct connection to L1—and obtains information about cache lines in L1 from the cache directory (112).

The cache controller (110) is a logic circuit that manages cache memory, providing an interface among processors (102), caches, and main memory (114). Although the cache controller (110) here is represented externally to the processors (102), cache controllers are often integrated on modern computers directly into a processor or an MMU. In this example, the MMUs (106) in fact include cache control logic for the L1 caches.

In the example of FIG. 1, cache controllers (110) on all compute nodes evict cache lines from L2 according to a cache replacement policy (303). Examples of cache replacement policies that can be used or adapted for use in horizontal cache persistence according to embodiments of the present invention include Least Recently Used ('LRU'), Most Recently Used ('MRU'), Pseudo-LRU, Segmented LRU, Least Frequently Used ('LFU'), Adaptive Replacement Cache ('ARC'), the Multi Queue ('MQ') caching algorithm—and others as will occur to those of skill in the art. When a cache controller (110) on a compute node (202) decides according to its cache replacement policy (303) to evict a cache line, the cache controller (110) broadcasts to the other compute nodes an eviction notice for the cache line. The eviction notice may be implemented, for example, as a broadcast packet containing a type code identifying the packet as an eviction notice and the tag of the evicted cache line. At this point in processing, but for the horizontal cache persistence processing according to embodiments of the present invention that enables the cache controller (110) to communicate with other compute nodes regarding cache line eviction, the cache controller on compute node (202) would be forced to either write the evicted cache line to main memory, or, if the evicted cache line is not dirty, risk evicting the cache line completely from all cache, both very undesirable results in terms of memory latency. Responsive to receiving the eviction notice, each of the other compute nodes (204, 206, 208, 210), that is, the compute nodes that received the eviction notice, transmits all other compute nodes the state of the cache line on that compute node, including, if the cache line is missing from that compute node, an indication whether that compute node has cache storage space available for the cache line.

The cache controller (110) of compute node (202) then proceeds with evicting the cache line. Now, however, in possession of the cache line state for the evicted cache line in all the other compute nodes as well as space available on the other compute nodes, the cache controller (110) in compute node (202) can determine, in dependence upon the states of the cache line in other compute nodes and space available in other compute nodes, whether compute node (202) can evict the cache line without writing the cache line to main memory. If another compute node has a correct copy of the evicted cache line, there is no need to write the evicted cache line to main memory even if the evicted cache line is dirty. If no other compute node has a correct copy of the evicted cache line, then compute node (202) can transmit the evicted cache line to that other compute node for storage on that other compute node, and again there is no need to write the cache line to main memory.

Each compute node (202, 204, 206, 208, 210) then updates the state of the cache line in that compute node, in dependence upon one or more of the states of the cache line in all the compute nodes. "Update" in this context means confirming that the current cache line state is correct in view of the information received from all the other compute nodes—regardless whether the state changes. In this sense, updating a cache line in a compute node where the cache line is missing entirely is the trivial case, involving no action on the part of that compute node or its cache controller. Updating may not require a change in a cache line state on any other compute node as well. If, for example, a compute node that received the eviction notice had a correct copy of the evicted cache line in SHARED state, that compute node would transmit the cache line state to the compute node that issued the eviction notice, but the SHARED state would in some embodiments remain unchanged in the updating confirmation of the cache line state in that compute node. If, for a further example, a compute node that received the eviction notice had an incorrect copy of a cache line in INVALID state thereby indicating available cache storage space for the evicted cache line, upon receiving a copy of the evicted cache line for storage, that compute node would some embodiments change the pertinent cache line state from INVALID to SHARED in the updating of the cache line state. Before the compute node (202) that broadcast the eviction notice is enabled to issue another broadcast pertinent to the same cache line, the compute nodes (204, 206, 208, 210) that received the eviction notice confirm to the compute node that broadcast the eviction notice that all the compute nodes that received the broadcast have completed the updating of the state of the cache line in each compute node.

Figure 2:
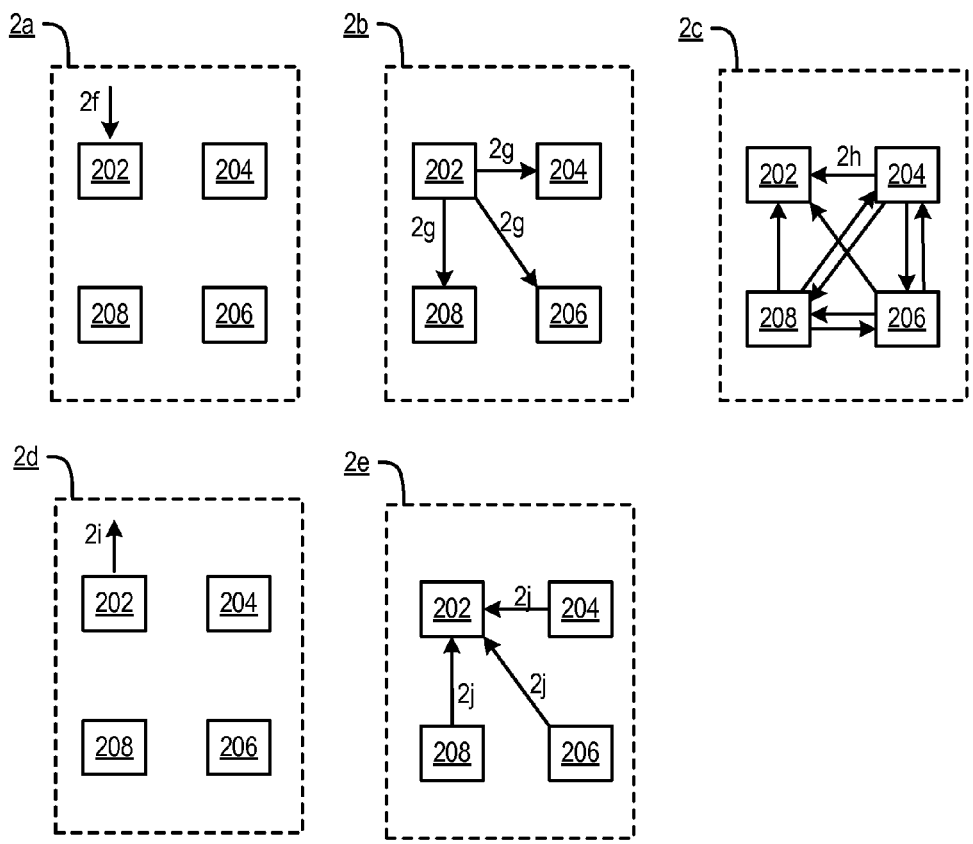
FIG. 2 illustrates a data processing sequence, steps 2a-2e, in an example of horizontal cache persistence processing according to embodiments of the present invention.

For further explanation, FIG. 2 illustrates a data processing sequence, steps 2a-2e, in an example of horizontal cache persistence processing according to embodiments of the present invention. In the example of FIG. 2, in step 2a, a cache controller on compute node (202) makes a determination (2f) to evict one of its cache lines. Compute node (202) then at step 2b broadcasts to the other compute nodes (204, 206, 208) an eviction notice (2g) for the cache line. Responsive to receiving the eviction notice (2g), each of the other compute nodes (204, 206, 208) in step 2c transmits to all other compute nodes the state (2h) of the cache line on that compute node including, if the cache line is missing from that compute node, an indication whether that compute node has cache storage space available for the cache line. If at least one of the compute nodes (204, 206, 208) that received the eviction notice (2g) has a correct copy of the cache line, that compute node also transmits in (2h) to the compute node that broadcast eviction notice the correct copy of the cache line. Also in step 2c, compute node (202) proceeds with evicting the cache line, including determining, in dependence upon the states of the cache line in other compute nodes and space available in other compute nodes, whether compute node (202) can evict the cache line without writing the cache line to main memory. Also in step 2c, each compute node (202, 204, 206, 208) updates the state of the cache line in that compute node (in parallel), in dependence upon one or more of the states of the cache line in all the compute nodes. In step 2d, upon evicting the cache line and replacing its cache storage with another cache line, the compute node (202) that broadcast the eviction notice releases (2i) the cache line for subsequent memory operations. Before the compute node (202) that broadcast the eviction notice (2g) is enabled to issue another broadcast regarding the same cache line or reuse the remote cache controllers, the compute nodes (204, 206, 208) that received the eviction notice confirm (2j in step 2e) to the compute node (202) that broadcast eviction notice (2g) that all the compute nodes that received the eviction notice have completed the updating of the state of the cache line in each compute node.

Figure 3:
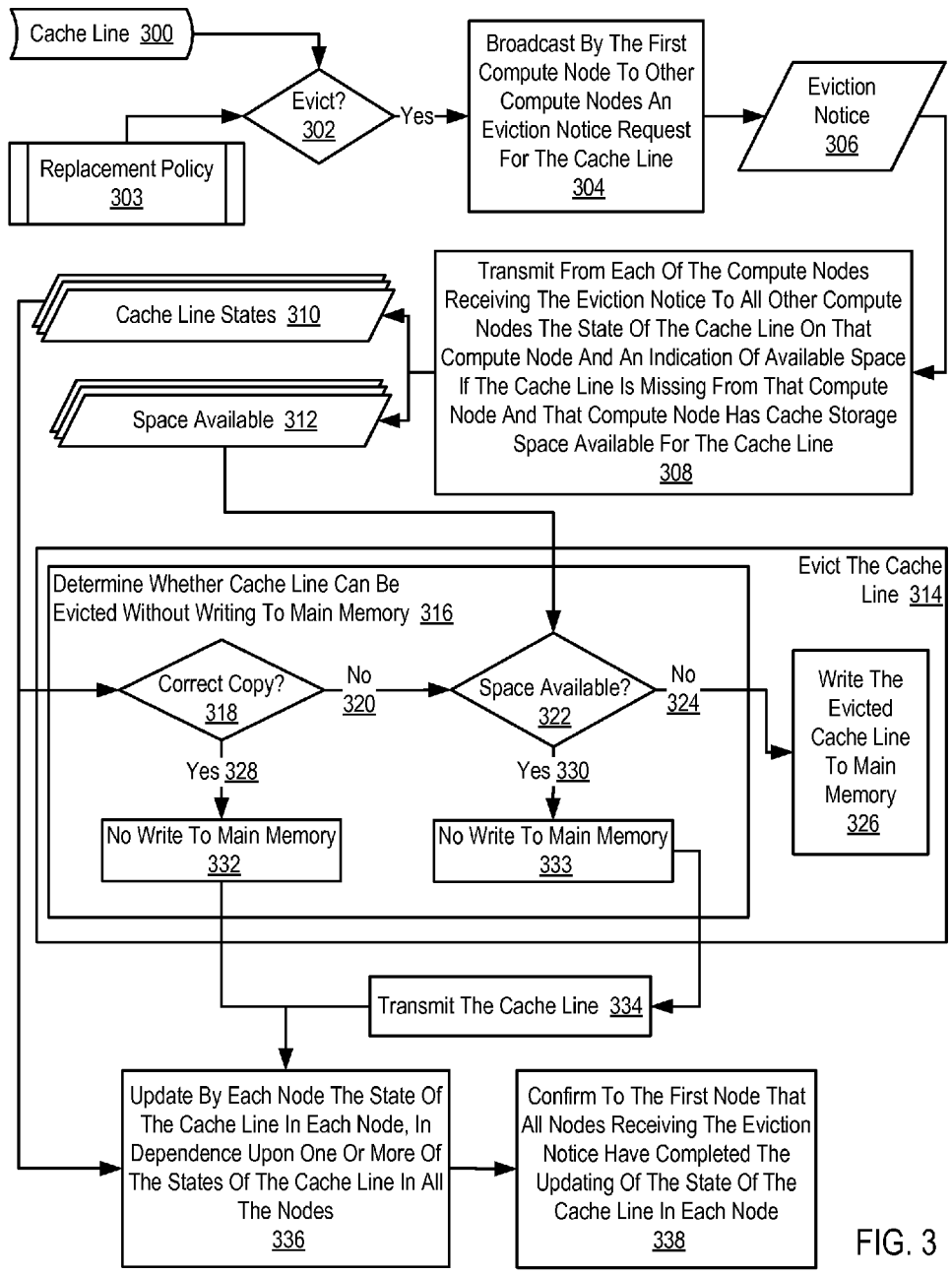
FIGS. 3-8 set forth flow charts illustrating example methods of horizontal cache persistence in a multi-compute node, symmetric multiprocessing computer according to embodiments of the present invention.

For further explanation, FIG. 3 sets forth a flow chart illustrating an example method of horizontal cache persistence in a multi-compute node, symmetric multiprocessing computer according to embodiments of the present invention. The method of FIG. 3 is implemented by and upon a multi-compute node, symmetric multiprocessing computer (100) like the one illustrated and described above with reference to FIG. 1. The method of FIG. 3 is described here, therefore, with reference to both FIGS. 1 and 3, using reference numbers from each drawing. In the computer (100), each compute node (202, 204, 206, 208, and 210) includes a number of processors (102) operatively coupled through cache controllers (110) to a cache (L2) of main memory (114). The main memory (114) is shared among the compute nodes (202, 204, 206, 208, and 210), and each cache controller (110) is coupled for data communications through a cache control bus (116) to cache controllers on the other compute nodes (202, 204, 206, 208, and 210).

Responsive to a determination (302) to evict a cache line (300) on a first one of the compute nodes (202), the method of FIG. 3 includes broadcasting (304) by the first compute node (202) to other compute nodes (204, 206, 208, and 210) an eviction notice (306) for the cache line. The determination (302) to evict the cache line is made according to a cache replacement policy (303), which, as mentioned, can be an LRU policy, an MRU policy, an ARC policy, and so on. The broadcast is of the kind sometimes referred to as an address broadcast because the broadcast typically includes the tag of the cache line to be evicted, that is, the address of the cache line in its cache, which is typically also a subset of the most significant bits in the hardware memory address of the beginning of the cache line where it is stored in main memory. In an embodiment, the broadcast eviction notice (306) also includes a specification of a type of broadcast identifying the broadcast as an eviction notice as opposed to an address broadcast pursuant to a READ or WRITE memory operation, for example.

Responsive to receiving the eviction notice (306), the method of FIG. 3 includes transmitting (308) from each of the compute nodes (204, 206, 208, and 210) receiving the eviction notice (306) to all other compute nodes the state (310) of the cache line on that compute node (204, 206, 208, and 210), including, if the cache line is missing from that compute node, an indication (312) whether that compute node has cache storage space available for the cache line.

The method of FIG. 3 also includes evicting (314) the cache line by the first compute node, in this example, by compute node (202). That is, now having all the cache line state information and space available from the other compute nodes, the first compute node then continues with the eviction. In carrying out the eviction, the first compute node determines (316), in dependence upon the states (310) of the cache line in other compute nodes and space available (312) in other compute nodes, whether the first compute node can evict the cache line without writing the cache line to main memory. Determining (316) whether to write the evicted cache line to main memory in this example includes determining (332) that the first compute node can evict the cache line without writing the cache line to main memory if the cache line state information (310) show a correct copy (326, 328) of the cache line on one of the other nodes.

Determining (316) whether to write the evicted cache line to main memory in this example also includes determining (333) that the first compute node can evict the cache line without writing the cache line to main memory if the cache line state information (310) show no correct copy (320) of the cache line on any of the other nodes and at least other compute node has space available (322, 330)—in which case, the method of FIG. 3 also includes transmitting (334) the cache line to the a node having space available for storage in the cache on that other compute node. Remember that in the example computer (100), main memory (114) represents a single extent of physical address space, but main memory is physically segmented and distributed across compute nodes, so that a main memory access from a processor on one compute to a main memory segment on the same compute node has smaller latency than an access to a segment of main memory on another compute node. In addition, each compute node contains a segment (114) of main memory organized according to hardware addresses, each of which can provide a cache line tag value. This is another way of saying that the data in each cache line resides in a segment of main memory on one of the compute nodes, and the compute node having the main memory segment where contents of a cache line are stored is said to have 'main memory affinity' for that cache line. A memory operation to or from a cache on a compute node having main memory affinity for an affected cache line will have the smallest latency of any memory operation on main memory. All memory operations to or from caches on compute nodes without memory affinity for an affected cache line will have larger latency than similar operations to or from main memory on a compute node having main memory affinity with the affected cache line. When a cache line is evicted by writing the cache line to main memory from a compute node without main memory affinity for the cache line, the cache line must be transmitted across the cache control bus (116) to the computer node having main memory affinity for the cache line before ultimately being written out to the segment of main memory on that compute node. Readers will recognize, however, that in the example of FIG. 3, transmitting (334) the cache line to the a node having space available for storage in the cache on that other compute node is carried out with no regard whatsoever to whether the receiving compute node has memory affinity for the cache line. That is, even if the receiving compute node in fact does not have main memory affinity for the evicted cache line, nevertheless the first compute node, when there is no other correct copy and the target node has space available, still transmits the evicted cache line to that other compute node for cache storage there.

The method of FIG. 3 also includes updating (336) by each compute node (202, 204, 206, 208, and 210) the state of the cache line in each compute node (202, 204, 206, 208, 210), in dependence upon one or more of the states of the cache line in all the compute nodes. As mentioned, "update" in this context means confirming that the current cache line state is correct in view of the information received from the other compute nodes—regardless whether the state changes. Updating therefore may not require changing a cache line state on any particular compute node.

The method of FIG. 3 also includes confirming (338) to the first compute node (202) that all compute nodes (204, 206, 208, and 210) receiving the eviction notice (306) have completed the updating of the state of the cache line in each compute node (204, 206, 208, 210). Upon receiving confirmation that the state of the cache line in each compute node is updated, the first compute node (202), the one that broadcast the eviction notice is enabled to issue another broadcast eviction notice or other broadcast regarding another cache line—reusing the same remote resources, though in typical embodiments there are a plethora of remote resources, the accelerated confirmation according to embodiments of the present invention reduces the remote resource utilization and enhances system performance.

Figure 4:
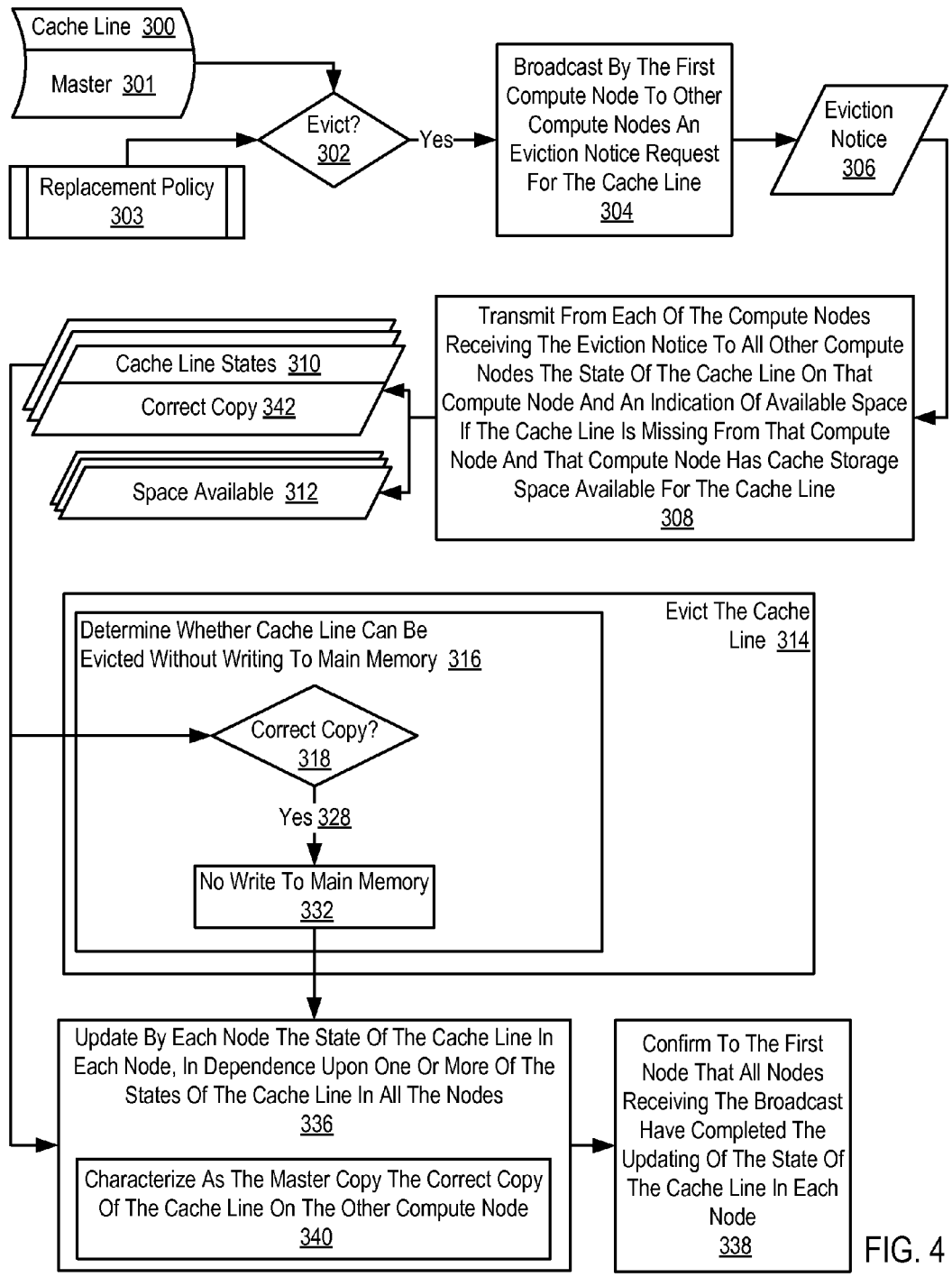

For further explanation, FIG. 4 sets forth a flow chart illustrating a further example method of horizontal cache persistence in a multi-compute node, symmetric multiprocessing computer according to embodiments of the present invention. Like the method of FIG. 3, the method of FIG. 4 is implemented by and upon a multi-compute node, symmetric multiprocessing computer (100) like the one illustrated and described above with reference to FIG. 1, so that the method of FIG. 4 is described with reference to both FIGS. 1 and 4, using reference numbers from each drawing. The method of FIG. 4 is similar to the method of FIG. 3, including as it does broadcasting (304) an eviction notice (306), transmitting (308) from each of the compute nodes receiving the eviction notice the state (310) of the cache line on that compute node including, if the cache line is missing from that compute node, an indication (312) whether that compute node has cache storage space available for the cache line, evicting (314) the cache line, including determining (316) whether the cache line can be evicted without writing the cache line to main memory, updating (336) the status of the cache line in all compute nodes, and confirming (338) the updating of the status of the cache line in all compute nodes.

In the method of FIG. 4, however, the cache line (300) to be evicted is characterized as a master copy (301) of the cache line. The characterization as 'master' is an element of a cache line state that indicates that a copy of a cache line has been preselected for use in at least some memory operations. This is an aid in selecting one cache line for use when the cache system as a whole contains more than one correct copy of the cache line. One convention for specifying any particular copy of the cache line as the master copy is to specify that the master copy is the copy of the cache line most recently accessed by a memory operation. When a cache line is first brought into cache from main memory, there being at that time no other copies of the cache line, that single copy can be designated a master. When another cache retrieves a copy of the cache line in a cross-node coherence operation, the new copy, being the most recently accessed is now designated the master. And so on. In the example of FIG. 4, the cache line state information (310) indicates (342) to the first compute node (202) that another compute node has a correct copy (318, 328) of the cache line. The first node, the node that broadcast the eviction notice, therefore determines (332) that it can evict the cache line without writing the cache line to main memory, and updating (336) the state of the cache line includes characterizing (340) as the master copy the correct copy of the cache line on the one other compute node.

Figure 5:
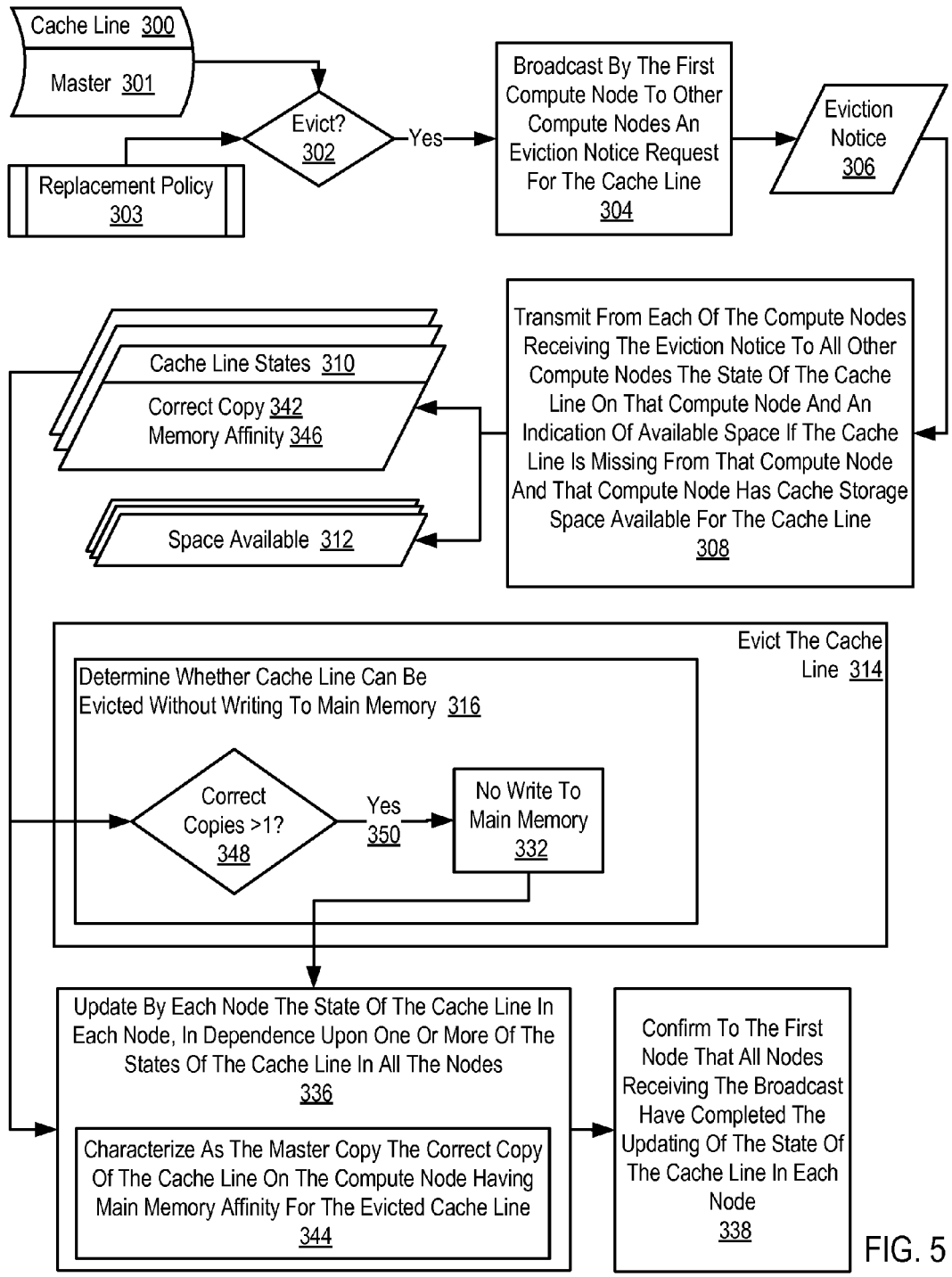

For further explanation, FIG. 5 sets forth a flow chart illustrating a further example method of horizontal cache persistence in a multi-compute node, symmetric multiprocessing computer according to embodiments of the present invention. Like the method of FIG. 3, the method of FIG. 5 is implemented by and upon a multi-compute node, symmetric multiprocessing computer (100) like the one illustrated and described above with reference to FIG. 1, so that the method of FIG. 5 is described with reference to both FIGS. 1 and 5, using reference numbers from each drawing. The method of FIG. 5 is similar to the method of FIG. 3, including as it does broadcasting (304) an eviction notice (306), transmitting (308) from each of the compute nodes receiving the eviction notice the state (310) of the cache line on that compute node including, if the cache line is missing from that compute node, an indication (312) whether that compute node has cache storage space available for the cache line, evicting (314) the cache line, including determining (316) whether the cache line can be evicted without writing the cache line to main memory, updating (336) the status of the cache line in all compute nodes, and confirming (338) the updating of the status of the cache line in all compute nodes.

In the method of FIG. 5, however, the cache line (300) to be evicted is characterized as a master copy (301) of the cache line, and the states (310, 342) of the cache line on the other compute nodes indicate to the first compute node that there is more than one correct copy (348, 350) on the other compute nodes, with one such copy on a compute node having main memory affinity (346) for the evicted cache line. With correct copies of the evicted cache line in cache somewhere on the computer, the compute node that broadcast the eviction notice determines (332) that the first compute node can evict the cache line without writing the cache line to main memory. In addition, updating (336) the state of the cache line includes characterizing (344) as the master copy the correct copy of the cache line on the compute node having main memory affinity for the evicted cache line. With more than one correct copy of the evicted cache line, having just evicted the master, the method selects as the new master the copy of the cache line on a compute node that has main memory affinity for the cache line. This preselects the instance of the cache line on the compute node with memory affinity for use in future memory operations some of which will risk a WRITE of the cache line to main memory. This preselection of the master copy of the cache line on the compute node with main memory affinity will result on average in the best overall latency for such memory operations.

Figure 6:
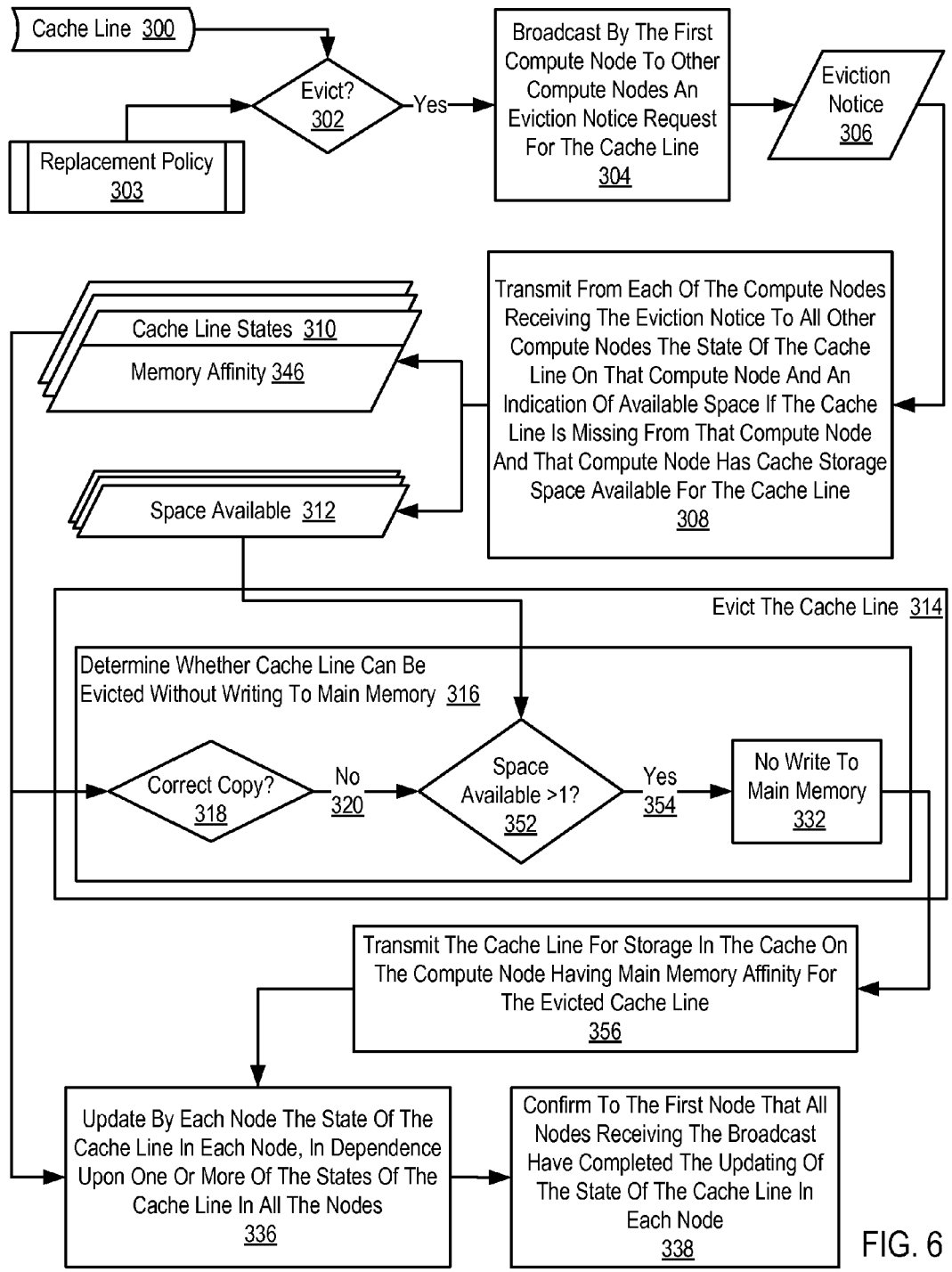

For further explanation, FIG. 6 sets forth a flow chart illustrating a further example method of horizontal cache persistence in a multi-compute node, symmetric multiprocessing computer according to embodiments of the present invention. Like the method of FIG. 3, the method of FIG. 6 is implemented by and upon a multi-compute node, symmetric multiprocessing computer (100) like the one illustrated and described above with reference to FIG. 1, so that the method of FIG. 6 is described with reference to both FIGS. 1 and 6, using reference numbers from each drawing. The method of FIG. 6 is similar to the method of FIG. 3, including as it does broadcasting (304) an eviction notice (306), transmitting (308) from each of the compute nodes receiving the eviction notice the state (310) of the cache line on that compute node including, if the cache line is missing from that compute node, an indication (312) whether that compute node has cache storage space available for the cache line, evicting (314) the cache line, including determining (316) whether the cache line can be evicted without writing the cache line to main memory, updating (336) the status of the cache line in all compute nodes, and confirming (338) the updating of the status of the cache line in all compute nodes.

In the method of FIG. 6, however, the states (310) of the cache line on the other compute nodes indicate to the first compute node (202) that no other compute node has a correct copy of the cache line (318, 320), that more than one other compute node has space available (352, 354), and that one compute node with space available has main memory affinity (346) for the evicted cache line. With space available for the evicted cache line in cache somewhere on the computer, the compute node that broadcast the eviction notice determines (332) that the first compute node can evict the cache line without writing the cache line to main memory. And the method of FIG. 6 includes transmitting (356) the cache line for storage in the cache on the compute node having main memory affinity for the evicted cache line. With more than one space available to store the cache line in cache on another node, the method selects as the new cache storage location for the cache line a compute node that has main memory affinity for the cache line. At this point in processing, there is only one copy of the cache line anywhere in cache. Placing the cache line on the compute node with main memory affinity reduces overall memory operation latency for memory operations that write the contents of the cache line to main memory. This placement of the cache line on the compute node with main memory affinity will result on average in the best overall latency for such memory operations.

Figure 7:
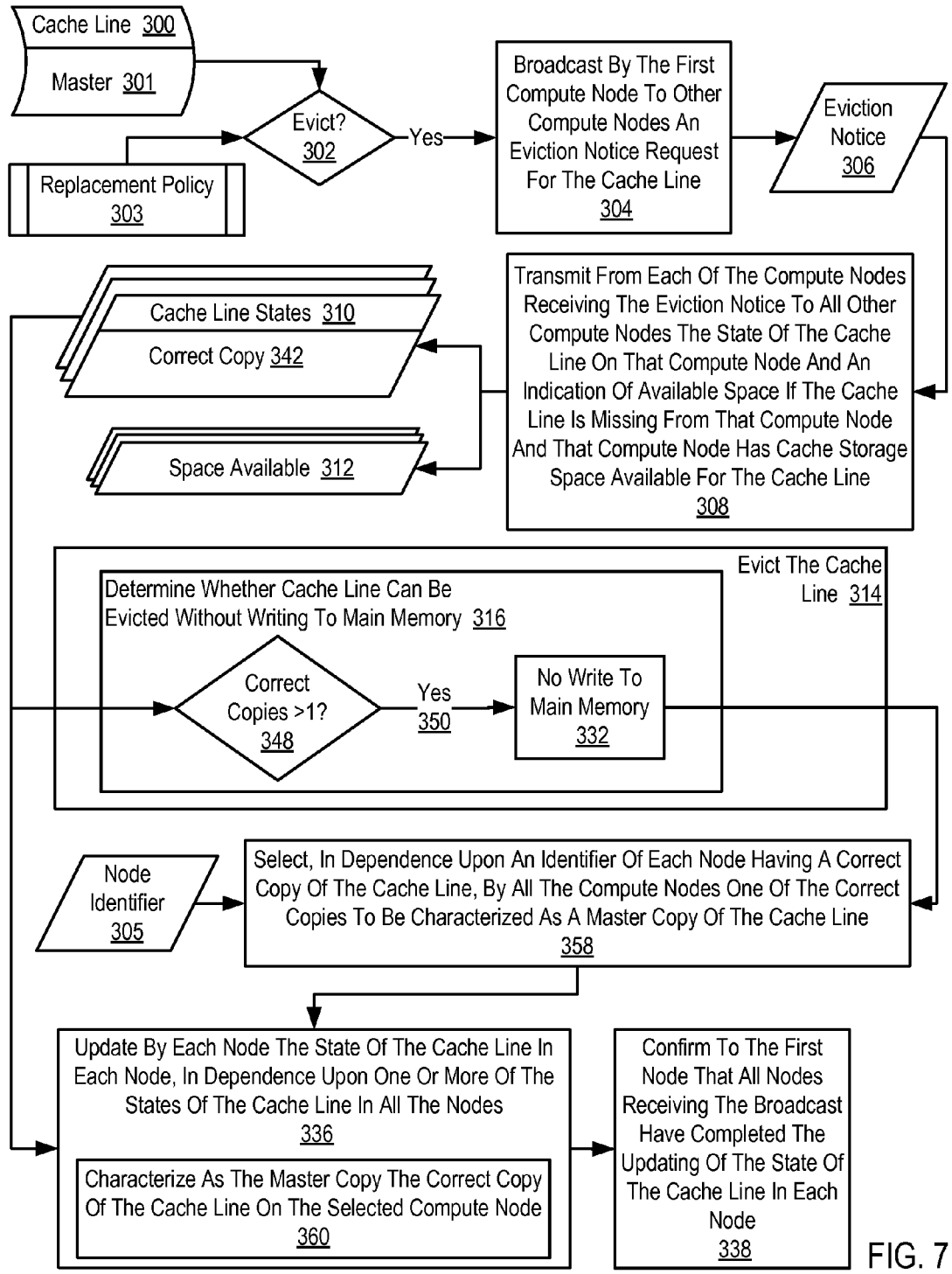

For further explanation, FIG. 7 sets forth a flow chart illustrating a further example method of horizontal cache persistence in a multi-compute node, symmetric multiprocessing computer according to embodiments of the present invention. Like the method of FIG. 3, the method of FIG. 7 is implemented by and upon a multi-compute node, symmetric multiprocessing computer (100) like the one illustrated and described above with reference to FIG. 1, so that the method of FIG. 7 is described with reference to both FIGS. 1 and 7, using reference numbers from each drawing. The method of FIG. 7 is similar to the method of FIG. 3, including as it does broadcasting (304) an eviction notice (306), transmitting (308) from each of the compute nodes receiving the eviction notice the state (310) of the cache line on that compute node including, if the cache line is missing from that compute node, an indication (312) whether that compute node has cache storage space available for the cache line, evicting (314) the cache line, including determining (316) whether the cache line can be evicted without writing the cache line to main memory, updating (336) the status of the cache line in all compute nodes, and confirming (338) the updating of the status of the cache line in all compute nodes.

In the method of FIG. 7, however, the cache line (300) to be evicted is characterized as a master copy (301) of the cache line, and the states (310, 342) of the cache line on the other compute nodes indicate to all compute nodes that there is more than one compute node containing a correct copy of the cache line (348, 350). With correct copies of the evicted cache line in cache somewhere on the computer, the compute node that broadcast the eviction notice determines (332) that the first compute node can evict the cache line without writing the cache line to main memory.

The method of FIG. 7 also includes selecting (358), in dependence upon an identifier (305) of each node having a correct copy of the cache line, by all the compute nodes one of the correct copies to be characterized as a master copy of the cache line. The node identifier (305) is a value unique to each compute node, so that including the identifier in responses indicating cache line states identifies, in this example, exactly which compute nodes have correct copies of the evicted cache line. Selecting one of the correct copies to be characterized as the master is said to be effected "by all the compute node" because, in this example, the cache controllers in all compute nodes operate according to the same cache coherence algorithm and protocol, so that each compute node, given coherence information from all compute nodes, makes its own determination which correct copy to select, and all compute nodes make the same determination.

Updating (336) the state of the cache line in the example of FIG. 7 includes characterizing (344) as the master copy the correct copy of the cache line on the selected compute node. With more than one correct copy of the evicted cache line, having just evicted the master, the method selects as the new master the copy of the cache line on a compute node selected according to its identifier, for example, selecting the compute node whose identifier has the smallest identifier value among compute nodes having a correct copy of the cache line. This selecting of a new master copy preselects the instance of the cache line on the selected compute node for use in future memory operations some of which will risk a WRITE of the cache line to main memory. This preselection of the master copy of the cache line on the selected compute node will result on average in the best overall latency for such memory operations.

Figure 8:
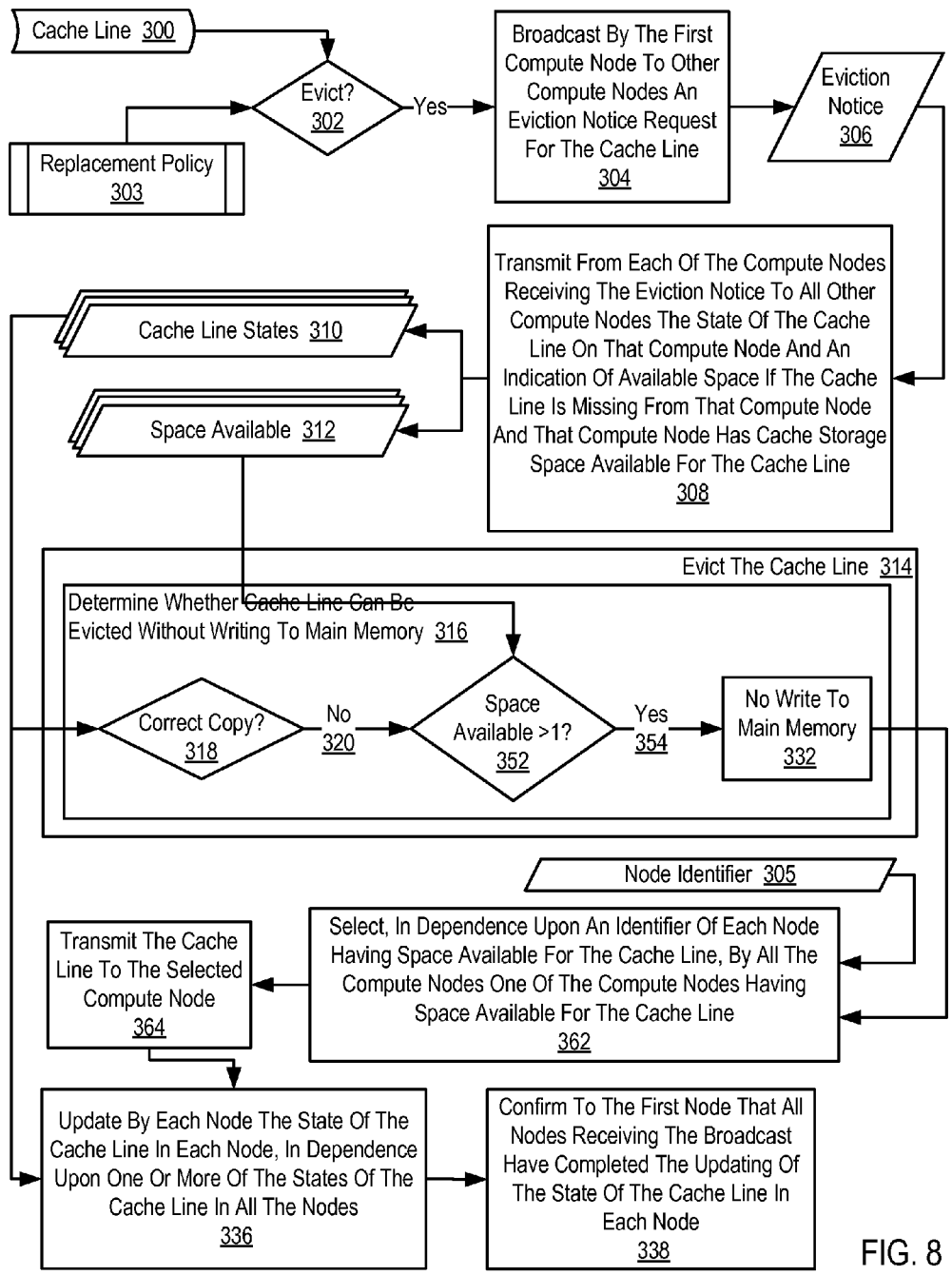

For further explanation, FIG. 8 sets forth a flow chart illustrating a further example method of horizontal cache persistence in a multi-compute node, symmetric multiprocessing computer according to embodiments of the present invention. Like the method of FIG. 3, the method of FIG. 8 is implemented by and upon a multi-compute node, symmetric multiprocessing computer (100) like the one illustrated and described above with reference to FIG. 1, so that the method of FIG. 8 is described with reference to both FIGS. 1 and 8, using reference numbers from each drawing. The method of FIG. 8 is similar to the method of FIG. 3, including as it does broadcasting (304) an eviction notice (306), transmitting (308) from each of the compute nodes receiving the eviction notice the state (310) of the cache line on that compute node including, if the cache line is missing from that compute node, an indication (312) whether that compute node has cache storage space available for the cache line, evicting (314) the cache line, including determining (316) whether the cache line can be evicted without writing the cache line to main memory, updating (336) the status of the cache line in all compute nodes, and confirming (338) the updating of the status of the cache line in all compute nodes.

In the method of FIG. 8, however, the states (310) of the cache line on the other compute nodes indicate to all compute nodes (202, 204, 206, 208, 210) that no other compute node has a correct copy of the cache line (318, 320) and that more than one other compute node has space available (352, 354). With space available for the evicted cache line in cache somewhere on the computer, the compute node that broadcast the eviction notice, that is, the first compute node, determines (332) that the first compute node can evict the cache line without writing the cache line to main memory.

The method of FIG. 8 also includes selecting (358), in dependence upon an identifier (305) of each node having space available for the cache line, by all the compute nodes one of the compute nodes having space available for the evicted cache line. The node identifier (305) is a value unique to each compute node, so that including the identifier in responses indicating cache line states identifies, in this example, exactly which compute nodes have space available for the evicted cache line. Selecting one of the correct copies to be characterized as the master is said to be effected "by all the compute node" because, in this example, the cache controllers in all compute nodes operate according to the same cache coherence algorithm and protocol, so that each compute node, given coherence information from all compute nodes, makes its own determination which correct copy to select, and all compute nodes make the same determination. In this way, one of the compute nodes having space available knows without being told that is the selected compute node— that that compute node and only that compute node will receive a copy of the evicted cache line.

The method of FIG. 8 includes transmitting (356) the cache line to the selected compute node for storage in the cache on the selected compute node. That is, the first compute node, the compute node that broadcast the eviction notice, transmits the evicted cache line to the selected compute node for storage in cache on the selected compute node.

Example embodiments of the present invention are described largely in the context of a fully functional computer system for horizontal cache persistence in a multi-compute node, SMP computer. Readers of skill in the art will recognize, however, that the present invention also may be embodied in a computer program product disposed upon computer readable storage media for use with any suitable data processing system, such as, for example, the computer readable media illustrated as an optical disk (60) on FIG. 9. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, that is as apparatus, or as a method or a computer program product. Accordingly, aspects of the present invention may take the form of an entirely hardware embodiment, embodiments that are at least partly software (including firmware, resident software, micro-code, etc.), with embodiments combining software and hardware aspects that may generally be referred to herein as a "circuit," "module," "apparatus," or "system." Furthermore, aspects of the present invention may take the form of a computer program product embodied in one or more computer readable media (e.g., optical disk (60) on FIG. 9) having computer readable program code embodied thereon.

Any combination of one or more computer readable media may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 9:
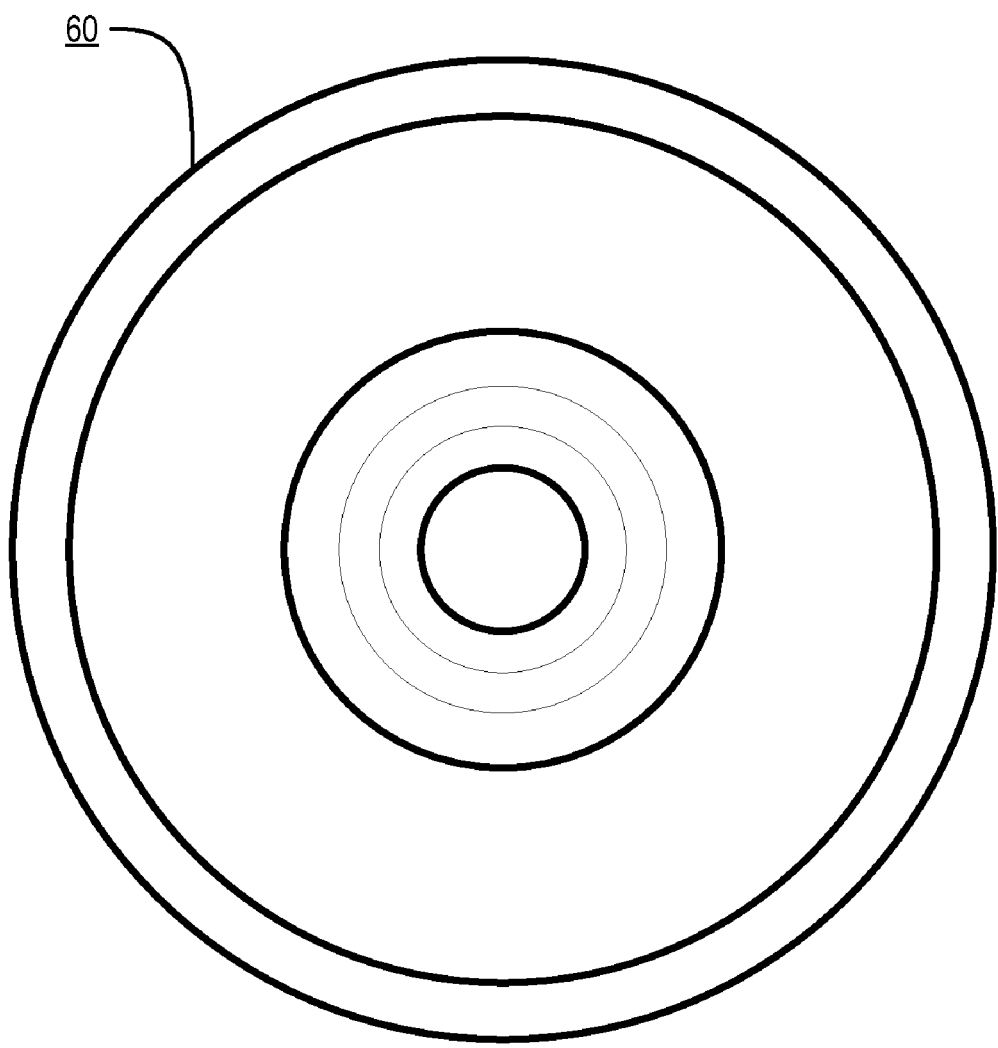
FIG. 9 illustrates an example form of computer readable media bearing program code which executable on a multi-node SMP computer, an article of manufacture that is a computer program product according to embodiments of the present invention.

These computer program instructions may also be stored in a computer readable medium that can direct a computer, other programmable data processing apparatus, or other devices to function in a particular manner, such that the instructions stored in the computer readable medium produce an article of manufacture (e.g., optical disk (60) on FIG. 9) including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of horizontal cache persistence in a multi-compute node, symmetric multiprocessing computer, the computer comprising a plurality of compute nodes, each compute node comprising at least one processor operatively coupled through a cache controller to at least one cache of main memory, the main memory shared among the compute nodes, each cache controller coupled for data communications to cache controllers on other compute nodes, the method comprising:

responsive to a determination to evict a cache line on a first one of the compute nodes, broadcasting by the first compute node to other compute nodes an eviction notice for the cache line;

responsive to receiving the eviction notice, transmitting from each of the compute nodes receiving the eviction notice to all other compute nodes the state of the cache line on that compute node, including, if the cache line is missing from that compute node, an indication whether that compute node has cache storage space available for the cache line;

evicting the cache line by the first compute node, including determining by the first compute node, in dependence upon the states of the cache line in other compute nodes and space available in other compute nodes, whether the first compute node can evict the cache line without writing the cache line to main memory; and updating by each compute node the state of the cache line in each compute node, in dependence upon one or more of the states of the cache line in all the compute nodes.

2. The method of claim 1 wherein:

the state of the cache line on at least one other compute node indicates to the first compute node that the other compute node has a correct copy of the cache line; and determining whether the first compute node can evict the cache line without writing the cache line to main memory comprises determining that the first compute node can evict the cache line without writing the cache line to main memory.

3. The method of claim 1 wherein:

the cache line to be evicted is characterized as a master copy of the cache line;

the state of the cache line on one of the other compute nodes indicates to the first compute node that the other compute node has a correct copy of the cache line;

determining whether the first compute node can evict the cache line without writing the cache line to main memory comprises determining that the first compute node can evict the cache line without writing the cache line to main memory; and updating the state of the cache line includes characterizing as the master copy the correct copy of the cache line on the one other compute node.

4. The method of claim 1 wherein:

the cache line to be evicted is characterized as a master copy of the cache line;

the states of the cache line on the other compute nodes indicate to the first compute node that there is more than one correct copy on the other compute nodes, with one such copy on a compute node having main memory affinity for the evicted cache line;

determining whether the first compute node can evict the cache line without writing the cache line to main memory comprises determining that the first compute node can evict the cache line without writing the cache line to main memory; and updating the state of the cache line includes characterizing as the master copy the correct copy of the cache line on the compute node having main memory affinity for the evicted cache line.

5. The method of claim 1 wherein:

the states of the cache line on the other compute nodes indicate to the first compute node that no other compute node has a correct copy of the cache line and that at least one other compute node has space available;

the method further comprises transmitting the cache line to the at least one other compute node for storage in the cache on the at least one other compute node; and determining whether the first compute node can evict the cache line without writing the cache line to main memory comprises determining that the first compute node can evict the cache line without writing the cache line to main memory.

6. The method of claim 1 wherein:

the states of the cache line on the other compute nodes indicate to the first compute node that no other compute node has a correct copy of the cache line, that more than one other compute node has space available, and that one compute node with space available has main memory affinity for the evicted cache line;

the method further comprises transmitting the cache line for storage in the cache on the compute node having main memory affinity for the evicted cache line; and determining whether the first compute node can evict the cache line without writing the cache line to main memory comprises determining that the first compute node can evict the cache line without writing the cache line to main memory.

7. The method of claim 1 wherein:

the cache line to be evicted is characterized as a master copy of the cache line;

the states of the cache line on the other compute nodes indicate to all compute nodes that there is more than one compute node containing a correct copy of the cache line;

the method further comprises selecting, in dependence upon an identifier of each node having a correct copy of the cache line, by all the compute nodes one of the correct copies to be characterized as a master copy of the cache line;

determining whether the first compute node can evict the cache line without writing the cache line to main memory comprises determining that the first compute node can evict the cache line without writing the cache line to main memory; and updating the state of the cache line includes characterizing as the master copy the correct copy of the cache line on the selected compute node.

8. The method of claim 1 wherein:

the states of the cache line on the other compute nodes indicate to all compute nodes that no other compute node has a correct copy of the cache line and that more than one compute node has space available for the cache line;

the method further comprises selecting, in dependence upon an identifier of each node having space available for the cache line, by all the compute nodes one of the compute nodes having space available for the cache line;

the method further comprises transmitting the cache line to the selected compute node for storage in the cache on the selected compute node; and determining whether the first compute node can evict the cache line without writing the cache line to main memory comprises determining that the first compute node can evict the cache line without writing the cache line to main memory.

9. A multi-node, symmetric multiprocessing computer configured so that it implements horizontal cache persistence, the computer comprising a plurality of compute nodes, each compute node comprising at least one processor operatively coupled through a cache controller to at least one cache of main memory, the main memory shared among the compute nodes, each cache controller coupled for data communications to cache controllers on other compute nodes, the cache controllers configured to function by:

responsive to a determination to evict a cache line on a first one of the compute nodes, broadcasting by the first compute node to other compute nodes an eviction notice for the cache line;

responsive to receiving the eviction notice, transmitting from each of the compute nodes receiving the eviction notice to all other compute nodes the state of the cache line on that compute node, including, if the cache line is missing from that compute node, an indication whether that compute node has cache storage space available for the cache line;

evicting the cache line by the first compute node, including determining by the first compute node, in dependence upon the states of the cache line in other compute nodes and space available in other compute nodes, whether the first compute node can evict the cache line without writing the cache line to main memory; and updating by each compute node the state of the cache line in each compute node, in dependence upon one or more of the states of the cache line in all the compute nodes.

10. The computer of claim 9 wherein:

the state of the cache line on at least one other compute node indicates to the first compute node that the other compute node has a correct copy of the cache line; and determining whether the first compute node can evict the cache line without writing the cache line to main memory comprises determining that the first compute node can evict the cache line without writing the cache line to main memory.

11. The computer of claim 9 wherein:

the cache line to be evicted is characterized as a master copy of the cache line;

the state of the cache line on one of the other compute nodes indicates to the first compute node that the other compute node has a correct copy of the cache line;

determining whether the first compute node can evict the cache line without writing the cache line to main memory comprises determining that the first compute node can evict the cache line without writing the cache line to main memory; and updating the state of the cache line includes characterizing as the master copy the correct copy of the cache line on the one other compute node.

12. The computer of claim 9 wherein:

the cache line to be evicted is characterized as a master copy of the cache line;

the states of the cache line on the other compute nodes indicate to the first compute node that there is more than one correct copy on the other compute nodes, with one such copy on a compute node having main memory affinity for the evicted cache line;

determining whether the first compute node can evict the cache line without writing the cache line to main memory comprises determining that the first compute node can evict the cache line without writing the cache line to main memory; and updating the state of the cache line includes characterizing as the master copy the correct copy of the cache line on the compute node having main memory affinity for the evicted cache line.

13. The computer of claim 9 wherein:

the states of the cache line on the other compute nodes indicate to the first compute node that no other compute node has a correct copy of the cache line and that at least one other compute node has space available;

the cache controllers are further configured to function by transmitting the cache line to the at least one other compute node for storage in the cache on the at least one other compute node; and determining whether the first compute node can evict the cache line without writing the cache line to main memory comprises determining that the first compute node can evict the cache line without writing the cache line to main memory.

14. The computer of claim 9 wherein:

the states of the cache line on the other compute nodes indicate to the first compute node that no other compute node has a correct copy of the cache line, that more than one other compute node has space available, and that one compute node with space available has main memory affinity for the evicted cache line;

the cache controllers are further configured to function by transmitting the cache line for storage in the cache on the compute node having main memory affinity for the evicted cache line; and determining whether the first compute node can evict the cache line without writing the cache line to main memory comprises determining that the first compute node can evict the cache line without writing the cache line to main memory.

15. The computer of claim 9 wherein:

the cache line to be evicted is characterized as a master copy of the cache line;

the states of the cache line on the other compute nodes indicate to all compute nodes that there is more than one compute node containing a correct copy of the cache line;

the cache controllers are further configured to function by selecting, in dependence upon an identifier of each node having a correct copy of the cache line, by all the compute nodes one of the correct copies to be characterized as a master copy of the cache line;

determining whether the first compute node can evict the cache line without writing the cache line to main memory comprises determining that the first compute node can evict the cache line without writing the cache line to main memory; and updating the state of the cache line includes characterizing as the master copy the correct copy of the cache line on the selected compute node.

16. The computer of claim 9 wherein:

the states of the cache line on the other compute nodes indicate to all compute nodes that no other compute node has a correct copy of the cache line and that more than one compute node has space available for the cache line;

the cache controllers are further configured to function by selecting, in dependence upon an identifier of each node having space available for the cache line, by all the compute nodes one of the compute nodes having space available for the cache line;

the cache controllers are further configured to function by transmitting the cache line to the selected compute node for storage in the cache on the selected compute node; and determining whether the first compute node can evict the cache line without writing the cache line to main memory comprises determining that the first compute node can evict the cache line without writing the cache line to main memory.

17. A computer program product for horizontal cache persistence in a multi-node, symmetric multiprocessing computer, the computer comprising a plurality of compute nodes, each compute node comprising at least one processor operatively coupled through a cache controller to at least one cache of main memory, the main memory shared among the compute nodes, each cache controller coupled for data communications to cache controllers on other compute nodes, the computer program product disposed upon a computer readable storage medium, the computer program product comprising computer program instructions which when executed by the cache controllers cause the cache controllers and the compute nodes to function by:

responsive to a determination to evict a cache line on a first one of the compute nodes, broadcasting by the first compute node to other compute nodes an eviction notice for the cache line;

responsive to receiving the eviction notice, transmitting from each of the compute nodes receiving the eviction notice to all other compute nodes the state of the cache line on that compute node, including, if the cache line is missing from that compute node, an indication whether that compute node has cache storage space available for the cache line;

evicting the cache line by the first compute node, including determining by the first compute node, in dependence upon the states of the cache line in other compute nodes and space available in other compute nodes, whether the first compute node can evict the cache line without writing the cache line to main memory; and updating by each compute node the state of the cache line in each compute node, in dependence upon one or more of the states of the cache line in all the compute nodes.

18. The computer program product of claim 17 wherein:

the state of the cache line on at least one other compute node indicates to the first compute node that the other compute node has a correct copy of the cache line; and determining whether the first compute node can evict the cache line without writing the cache line to main memory comprises determining that the first compute node can evict the cache line without writing the cache line to main memory.

19. The computer program product of claim 17 wherein:

the cache line to be evicted is characterized as a master copy of the cache line;

the state of the cache line on one of the other compute nodes indicates to the first compute node that the other compute node has a correct copy of the cache line;

determining whether the first compute node can evict the cache line without writing the cache line to main memory comprises determining that the first compute node can evict the cache line without writing the cache line to main memory; and updating the state of the cache line includes characterizing as the master copy the correct copy of the cache line on the one other compute node.

20. The computer program product of claim 17 wherein:

the cache line to be evicted is characterized as a master copy of the cache line;

the states of the cache line on the other compute nodes indicate to the first compute node that there is more than one correct copy on the other compute nodes, with one such copy on a compute node having main memory affinity for the evicted cache line;

determining whether the first compute node can evict the cache line without writing the cache line to main memory comprises determining that the first compute node can evict the cache line without writing the cache line to main memory; and updating the state of the cache line includes characterizing as the master copy the correct copy of the cache line on the compute node having main memory affinity for the evicted cache line.

21. The computer program product of claim 17 wherein:

the states of the cache line on the other compute nodes indicate to the first compute node that no other compute node has a correct copy of the cache line and that at least one other compute node has space available;

the computer program product further comprises computer program instructions which when executed by the cache controllers cause the cache controllers and the compute nodes to function by transmitting the cache line to the at least one other compute node for storage in the cache on the at least one other compute node; and determining whether the first compute node can evict the cache line without writing the cache line to main memory comprises determining that the first compute node can evict the cache line without writing the cache line to main memory.

22. The computer program product of claim 17 wherein:

the states of the cache line on the other compute nodes indicate to the first compute node that no other compute node has a correct copy of the cache line, that more than one other compute node has space available, and that one compute node with space available has main memory affinity for the evicted cache line;

the computer program product further comprises computer program instructions which when executed by the cache controllers cause the cache controllers and the compute nodes to function by transmitting the cache line for storage in the cache on the compute node having main memory affinity for the evicted cache line; and determining whether the first compute node can evict the cache line without writing the cache line to main memory comprises determining that the first compute node can evict the cache line without writing the cache line to main memory.

23. The computer program product of claim 17 wherein:

the cache line to be evicted is characterized as a master copy of the cache line;

the states of the cache line on the other compute nodes indicate to all compute nodes that there is more than one compute node containing a correct copy of the cache line;

the computer program product further comprises computer program instructions which when executed by the cache controllers cause the cache controllers and the compute nodes to function by selecting, in dependence upon an identifier of each node having a correct copy of the cache line, by all the compute nodes one of the correct copies to be characterized as a master copy of the cache line;

determining whether the first compute node can evict the cache line without writing the cache line to main memory comprises determining that the first compute node can evict the cache line without writing the cache line to main memory; and updating the state of the cache line includes characterizing as the master copy the correct copy of the cache line on the selected compute node.

24. The computer program product of claim 17 wherein:

the states of the cache line on the other compute nodes indicate to all compute nodes that no other compute node has a correct copy of the cache line and that more than one compute node has space available for the cache line;

the computer program product further comprises computer program instructions which when executed by the cache controllers cause the cache controllers and the compute nodes to function by selecting, in dependence upon an identifier of each node having space available for the cache line, by all the compute nodes one of the compute nodes having space available for the cache line;

the computer program product further comprises computer program instructions which when executed by the cache controllers cause the cache controllers and the compute nodes to function by transmitting the cache line to the selected compute node for storage in the cache on the selected compute node; and determining whether the first compute node can evict the cache line without writing the cache line to main memory comprises determining that the first compute node can evict the cache line without writing the cache line to main memory.

* * * * *